United States Patent
Lin et al.

(10) Patent No.: US 8,031,293 B2
(45) Date of Patent: Oct. 4, 2011

(54) BACKLIGHT MODULE WITH LIGHT SOURCE HOLDER AND LIQUID CRYSTAL DISPLAY USING THE SAME

(75) Inventors: Ping-Jung Lin, Miao-Li (TW); Hsueh-Tien Chang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 671 days.

(21) Appl. No.: 12/069,803

(22) Filed: Feb. 12, 2008

(65) Prior Publication Data
US 2008/0192177 A1   Aug. 14, 2008

(30) Foreign Application Priority Data
Feb. 12, 2007   (TW) ................................. 96104983 A

(51) Int. Cl.
*G02F 1/1335* (2006.01)
*F21V 7/04* (2006.01)
(52) U.S. Cl. ........... 349/65; 362/612; 362/632; 362/634

(58) Field of Classification Search ................ 349/65; 362/613, 632–634
See application file for complete search history.

(56) References Cited

U.S. PATENT DOCUMENTS

| 5,453,855 | A * | 9/1995 | Nakamura et al. .............. 349/58 |
| 6,609,808 | B2 | 8/2003 | Chen |
| 2005/0068471 | A1* | 3/2005 | Aoyagi et al. .................. 349/62 |
| 2006/0012731 | A1* | 1/2006 | Ishiwa et al. ..................... 349/65 |

FOREIGN PATENT DOCUMENTS

| CN | 2596386 Y | 12/2003 |
| CN | 200420103113.6 Y | 3/2006 |

* cited by examiner

*Primary Examiner* — Lauren Nguyen
(74) *Attorney, Agent, or Firm* — Altis Law Group, Inc.

(57) ABSTRACT

An exemplary backlight module (1) includes a light guide plate (10) and at least one light source assembly (16). Each of the light source assembly includes a plurality of point light sources (163) and a light source holder (160). The light source holder accommodates the point light sources and an end portion (12) of the light guide plate, with a distance between the end portion and the point light sources.

8 Claims, 4 Drawing Sheets

BACKLIGHT MODULE WITH LIGHT SOURCE HOLDER AND LIQUID CRYSTAL DISPLAY USING THE SAME

FIELD OF THE INVENTION

The present invention relates to backlight modules and liquid crystal display (LCD) devices, and particularly to a backlight module with light source holder and an LCD device using the backlight module.

GENERAL BACKGROUND

LCD devices are commonly used as display devices for compact electronic apparatuses. This is because LCD devices not only provide good quality images, but also are very thin and consume little power. The liquid crystal in a liquid crystal display device is not capable of emitting light by itself. The liquid crystal has to be lit by a light source so as to clearly and sharply display text and images. Thus, a backlight module for an LCD is generally needed.

Referring to FIG. 6, a conventional backlight module 6 includes a light guide plate (LGP) 60, a plurality of light emitting diodes (LEDs) 62, a conductive line group 63, and an LED controller 64. The LGP 60 has a side surface 601 for receiving incident light beams, and a top surface 602 for emitting the light beams. The top surface 602 adjoins the side surface 601. The LEDs 62 are disposed adjacent to the side surface 601 of the LGP 60. The LED controller 64 is connected to each of the LEDs 62 via the connective line group 63, for controlling work states of the LEDs 62.

In operation, light beams emitted by the LEDs 62 enter the LGP 60 via the side surface 601, and are converted by the LGP 60 to form a surface light source at the top surface 602. However, each of the LEDs 62 has a certain limited angle of divergence of light beams emitted therefrom. Therefore, areas of the LGP 60 beyond the angles of divergence of the LEDs 62, such as area A, may be relatively dark areas. That is, the surface light source of the backlight module 6 may be non-uniform, and the performance of an associated LCD device may be visibly impaired. Furthermore, the LEDs 62 are connected to the LED controller 64 via the conductive line group 63, conductive lines of the conductive line group 63 are easily to be broken. This decreases a reliability of the backlight module 6.

What is needed, therefore, is a backlight module that can overcome the above-described deficiencies. What is also need is an LCD device employing such a backlight module.

SUMMARY

In one aspect, a backlight module includes a light guide plate and at least one light source assembly. Each of the light source assembly includes a plurality of point light sources and a light source holder. The light source holder accommodates the point light sources and an end portion of the light guide plate and defines a distance between the end portion and the point light sources.

In another aspect, a backlight module includes a light guide plate, a plurality of light source, and a connector. The connector configured for housing the light sources and being connected with the light guide plate, and defines a space between the light sources and the light guide plate.

In still another aspect, a liquid crystal display device is disclosed. The liquid crystal display device includes a liquid crystal display panel and a backlight module configured for providing light beams to illuminate the liquid crystal display panel. The backlight module includes a light guide plate with an end portion for receiving light beams and at least one light source assembly. Each of the light source assembly includes a plurality of point light sources and a light source holder. The light source holder accommodates the point light sources and the end portion of the light guide plate and defines a distance between the end portion of the light guide plate and the point light sources.

In other aspect, advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the described embodiments. In the drawings, like reference numerals designate corresponding parts throughout various views, and all the views are schematic.

DETAILED DESCRIPTION OF PREFERRED EMBODIMENTS

Reference will now be made to the drawings to describe the preferred embodiments in detail.

Figure 1:
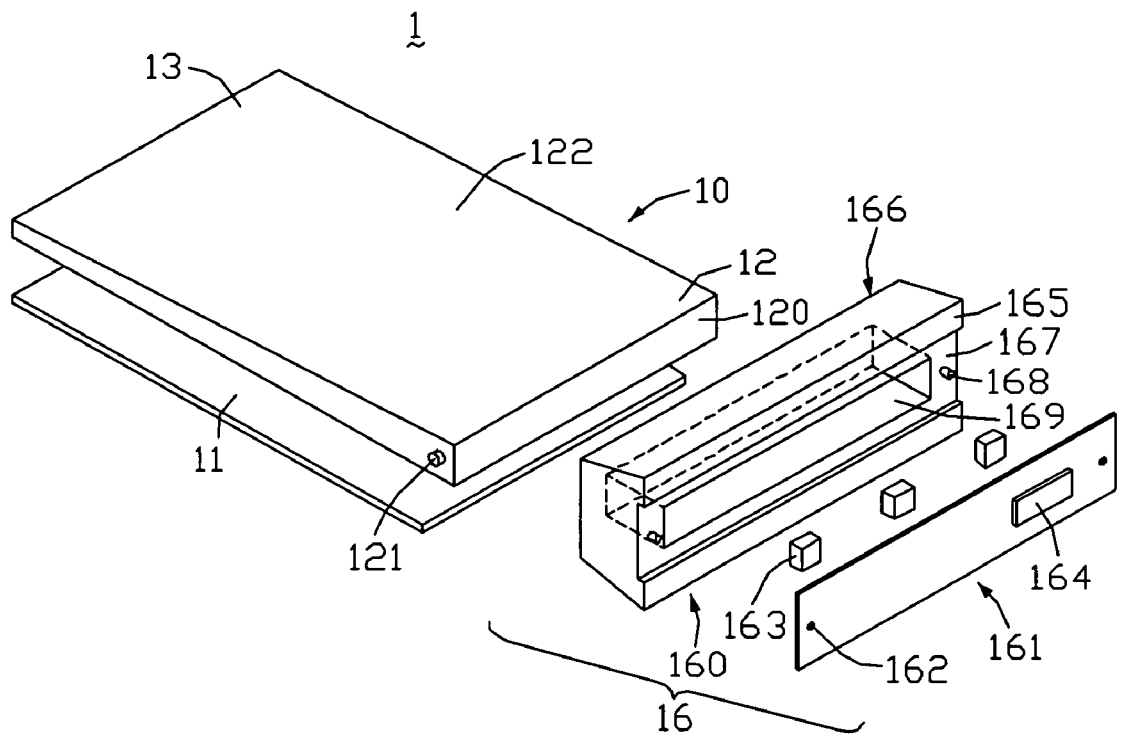
FIG. 1 is an exploded, isometric view of the backlight module of FIG. 1.

Referring to FIG. 1, a backlight module 1 according to a first embodiment of the present invention includes an LGP 10, a reflective film 11 disposed under the LGP 10, and a light source assembly 16 disposed adjacent to an end of the LGP 10.

The LGP 10 includes a first end portion 12 with a side surface 120 for receiving incident light beams, a second end portion 13 opposite to the first end portion 12, a top surface 122 adjoining the side surface 120, and at least two protrusions 121 at two sides of the first end portion 12. A thickness of the LGP 10 gradually decreases from the first end portion 12 to the second end portion 13.

The light source assembly 16 includes a light source holder 160, a flexible printed circuit (FPC) 161, a plurality of point light sources 163 such as LEDs, and a light source controller 164.

The light source holder 160 has a larger first surface 165, a parallel smaller second surface 166, and a trapezoid cross section (not labeled). The trapezoid cross section is perpendicular to the first and second surfaces 165, 166. A depressed portion 167 is defined at the first surface 165. Two tenons 168 are formed at two sides of the depressed portion 167. Between the two tenons 168, a through hole 169 is formed through the light source holder 160 from the first surface 165 to the second surface 166. The light source holder 160 can for example be made from polycarbonate (PC) or polymethyl methacrylate (PMMA).

The FPC 161 has two fixing holes 162 at two edge portions corresponding to the two tenons 168 of the light source holder 160. The point light sources 163 are arranged at one surface of the FPC 161, where a reflective layer (not shown) is attached. The reflective layer can be a film that is made of reflective material. Such film can for example be a coating of metallic material. The metallic material can be silver, zinc, or another suitable metal or alloy. The light source controller 164 is arranged at the other surface of the FPC 161.

Figure 2:
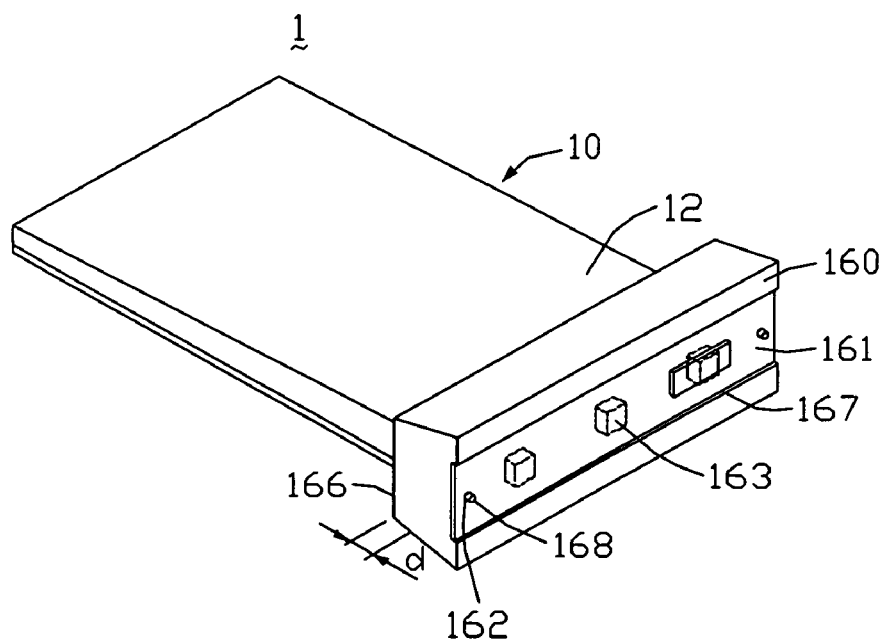
FIG. 2 is a pre-assembled view of a backlight module according to a first embodiment of the present invention.

Also referring FIG. 2, in assembly of the backlight module 1, the FPC 161 is disposed in the depressed portion 167, with the point light sources 163 being accommodated in the through hole 169. The two tenons 168 of the LGP 10 insert into the two fixing holes 162 of the FPC 161, respectively, in order to fix the FPC 161 at the light source holder 160. The first end portion 12 of the LGP 10 partially inserts into the through hole 169 from the second surface 166 of the light source holder 160, with a distance "d" between the first end portion 12 of the LGP 10 and the point light sources 163. The protrusions 121 of the LGP 10 function as fixing members, for firmly fixing the light source assembly 16 together with the light guide plate 10.

In operation, light beams emitted by the point light sources 163 transmit into the through hole 169. In the through hole 169, the light beams of each point light sources 163 cover a certain range of angles of divergence. When the light beams transmit into the LGP 10, ranges of light beam emitted by the point light sources 163 overlap with each other. Then the light beams are transformed into a surface light emitting from the top surface 122 of the LGP 10. Accordingly, light beams emitted by the point light sources 163 reach all areas of the LGP 10. That is, dark areas such as the areas A of the above-described conventional backlight module 6 are avoided. As a result, an improved uniformity of brightness of the backlight module 2 can be achieved. Furthermore, because the point light sources 163 and the light source controller 164 are both arranged on the FPC 161, conductive lines for connecting the point light sources 163 and the light source controller 164 can be formed on the FPC 161. This enhances a reliability of the light source assembly 13. Moreover, a reflective layer can also be attached on the FPC 161. The reflective layer and inwalls of the through hole 169 reflect portion of the light beams emitted by the point light sources 163 back into the LGP 10 to be utilized. This increases a utilization ratio of light beams of the light source assembly 16. In addition, because the through hole 169 is formed in the light source holder 16, point light sources 163 with varied shapes can be accommodated therein. This provides multiple choices for selecting the point light sources 163.

Figure 3:
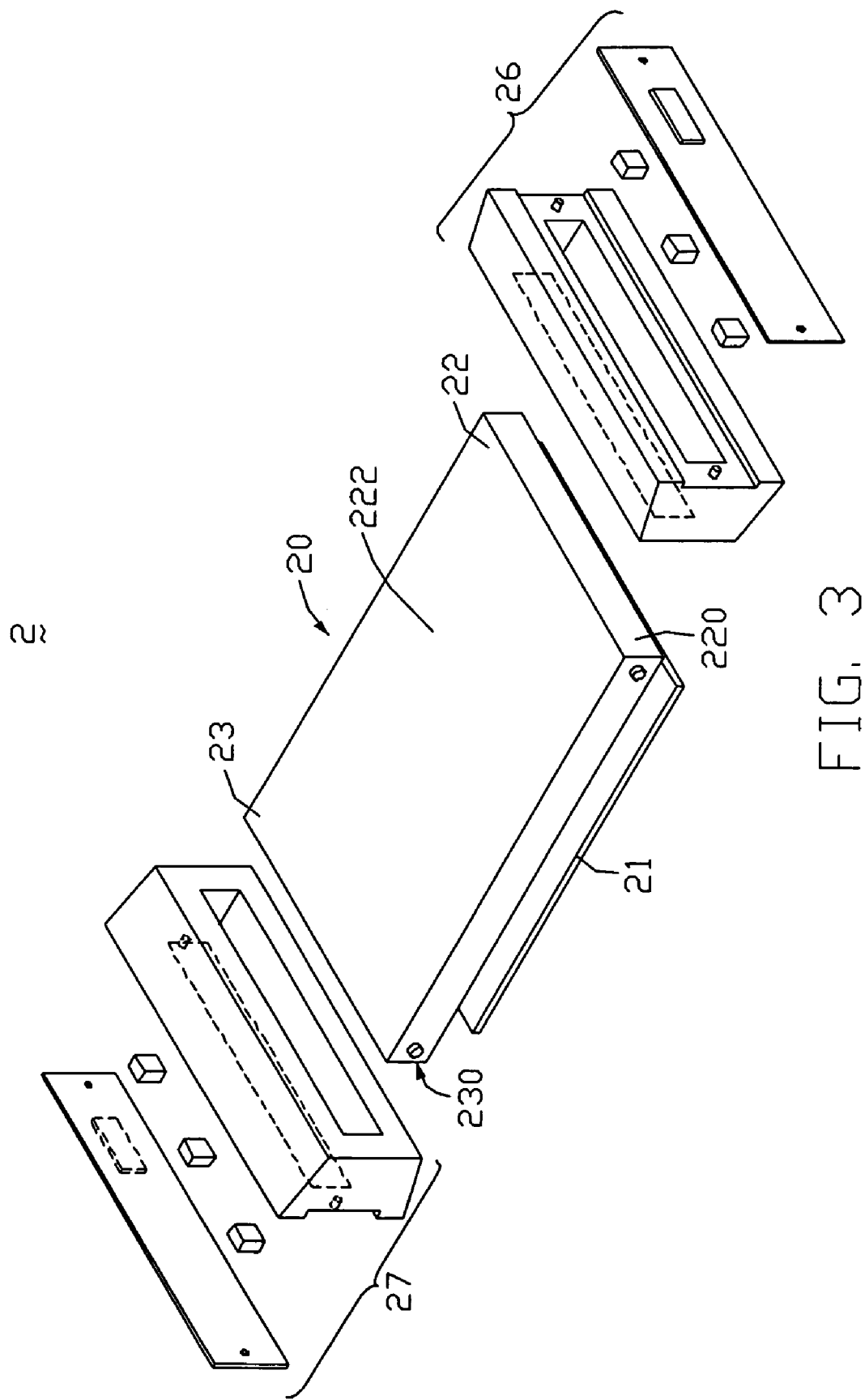
FIG. 3 is an exploded, isometric view of a backlight module according to a second embodiment of the present invention.

Referring to FIG. 3, a backlight module according to a second embodiment of the present invention is shown. The backlight module 2 includes an LGP 20, a reflective plate 21 under the LGP 20, a first light source assembly 26, and a second light source assembly 27. The LGP 20 includes a first side surface 220 at a first end portion 22, and a second side surface 230 at a second portion 23. The first and second side surfaces 220, 230 are both configured for receiving light beams. The first and second light source assembly 26, 27 are both similar to the light source assembly 16 of the backlight module 1. The first and second light source assembly 26, 27 are disposed at the first and the second end portion 22, 23 of the LGP 20, symmetrically. Light beams emitted by the first and second light source assembly 26, 27 transmit into the LGP 20 from the first and second side surfaces 220, 230, respectively, and are then transformed into a surface light emitting from the top surface 222 of the LGP 20.

Figure 4:
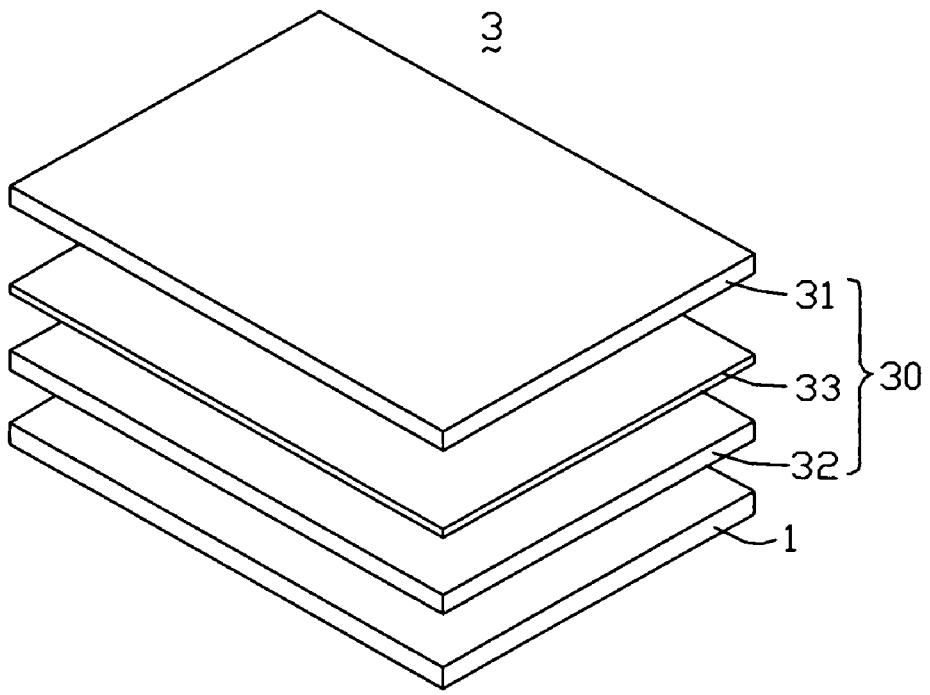
FIG. 4 is an exploded, isometric view of an LCD device employing the backlight module of FIG. 1.

FIG. 4 is an exploded, isometric view of an LCD device according to a first embodiment of the present invention, with the backlight module 1 installed therein. The LCD device 3 further includes an LCD panel 30 which includes a first substrate 31, a second substrate 32 parallel to the first substrate 31, and a liquid crystal layer 33 interposed between the first and the second substrates 31, 32. The backlight module 1 is disposed under the LCD panel 30. The backlight module 1 is configured for providing light beams to illuminate the LCD panel 30.

Figure 5:
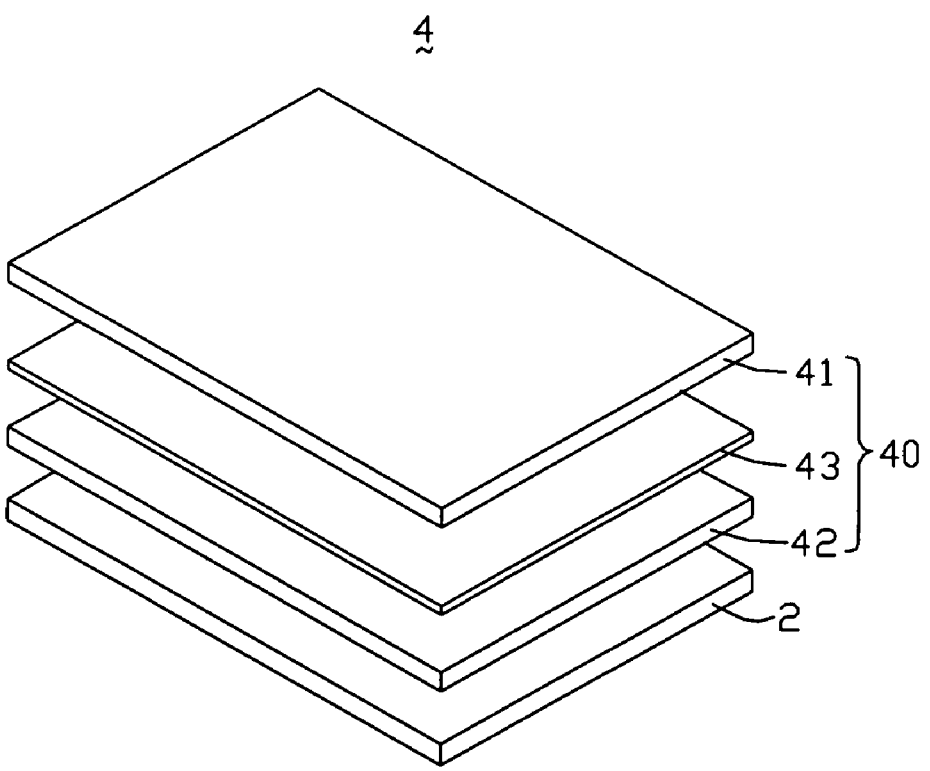
FIG. 5 is an exploded, isometric view of another LCD device employing the backlight module of FIG. 3.
Figure 6:
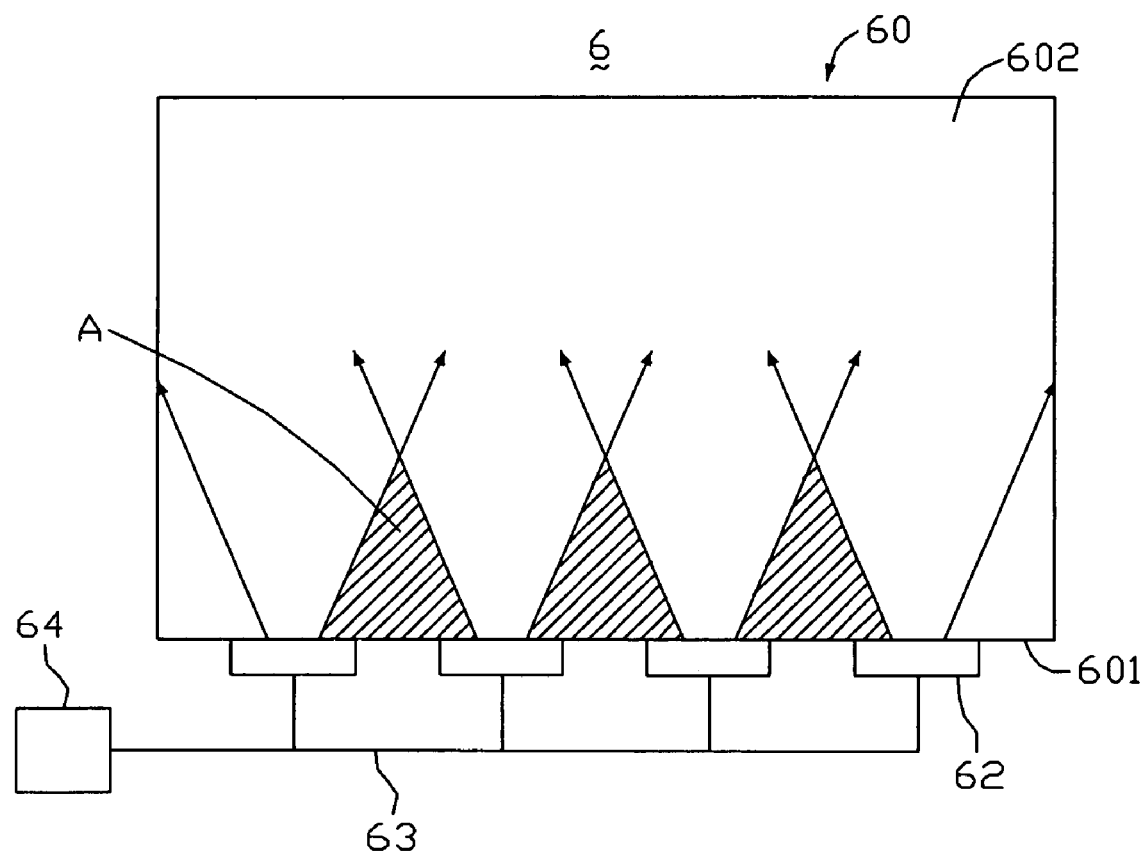
FIG. 6 is a top plan view of a conventional backlight module, showing essential optical paths thereof.

FIG. 5 is an exploded, isometric view of an LCD device according to a second embodiment of the present invention, with the backlight module 2 installed therein. The LCD device 4 further includes an LCD panel 40 which includes a first substrate 41, a second substrate 42 parallel to the first substrate 41, and a liquid crystal layer 43 interposed between the first and the second substrates 41, 42. The backlight module 2 is disposed under the LCD panel 40. The backlight module 2 is configured for providing light beams to illuminate the LCD panel 40.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A backlight module comprising:
   a light guide plate with an end portion; and
   at least one light source assembly, each of which comprises:
      a plurality of point light sources; and
      a light source holder accommodating the point light sources and the end portion of the light guide plate and defining a distance between the end portion and the point light sources, the holder comprising a first surface, a second surface parallel to the first surface, the second surface being adjacent to the end portion of the light guide plate, wherein the light source holder defines a through hole from the first surface to the second surface, the point light sources being accommodated in the through hole, and a cross section of the holder perpendicular to the first and second surfaces is substantially trapezoid, a width of the cross section gradually decreasing from the first surface towards the second surface.

2. The backlight module as claimed in claim 1, wherein the end portion of the light guide plate is inserted into the through hole.

3. The backlight module as claimed in claim 1, wherein the light source assembly further comprises a flexible printed circuit, the point light sources being arranged at one surface of the flexible printed circuit.

4. The backlight module as claimed in claim 3, wherein the light source assembly further comprises a light source controller being arranged at the other surface of the flexible printed circuit.

5. The backlight module as claimed in claim 3, wherein the flexible printed circuit is fixed at the first surface of the light source holder.

6. The backlight module as claimed in claim 3, wherein two protrusions are defined at two ends of the first surface of the light source holder, and two fixing holes are defined at two ends of the flexible printed circuit, the two protrusions inserting into the two fixing holes respectively for fixing the flexible printed circuit at the light source holder.

7. The backlight module as claimed in claim 3, wherein a reflective film is arranged at the surface of the flexible printed circuit where the point light sources are arranged.

8. The backlight module as claimed in claim 1, wherein the point light sources are light emitting diodes.

* * * * *